Dec. 11, 1928.
W. D. COOLIDGE
VACUUM DEVICE
Filed Oct. 30, 1926
1,694,967
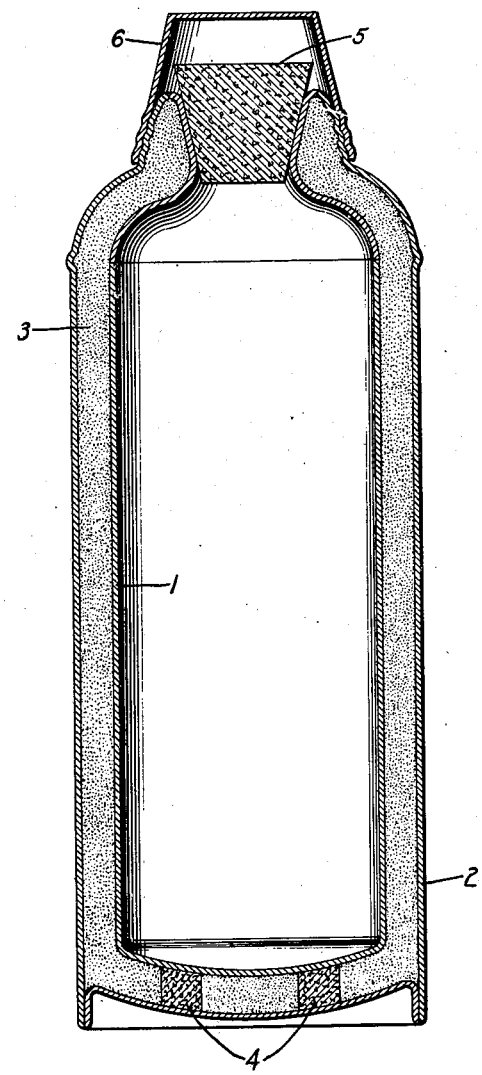
Inventor:
William D. Coolidge.

Patented Dec. 11, 1928.

1,694,967

UNITED STATES PATENT OFFICE.

WILLIAM D. COOLIDGE, OF SCHENECTADY, NEW YORK, ASSIGNOR TO GENERAL ELECTRIC COMPANY, A CORPORATION OF NEW YORK.

VACUUM DEVICE.

Application filed October 30, 1926. Serial No. 145,331.

The present invention relates to vacuum devices which contain a charge of finely divided material and in particular to heat-insulating devices which comprises an evacuated space filled with a finely divided solid, such as lampblack, for example.

I have discovered that the effectiveness of heat insulators of this character can be greatly improved by providing a water-absorptive material in the vacuum space. The novel features of my invention will be further explained hereinafter and pointed out in the accompanying claims.

The accompanying drawing shows in vertical section a double-walled bottle-shaped receptacle as illustrative of one particular form of device wherein my invention may be embodied.

This device comprises an inner container 1 and a housing 2 consisting of metal, glass or other suitable material, the inner and outer containers being spaced and sealed in such a manner as to provide an intermediate evacuated space. This evacuated space contains a charge 3 of finely divided matter, such as lampblack, graphite or other carbonaceous material, silicon dioxide or monoxide, alumina, powdered carbides, borides or other inert materials. These materials by sub-dividing the evacuated space materially increase the heat insulation afforded thereby. The pads 4 for preventing vibration of the inner container, the stopper 5 and the cap 6 have been illustrated merely to show a complete device and have nothing to do with the present improvement.

In accordance with my invention, a water-reactive material, such as phosphorous pentoxide, is associated with the charge of inert material. I have found that by the presence of this material the heat insulation of a given device has been increased over three-fold. Apparently water is held very tenaciously by finely-divided materials, and by its presence the heat conductivity is materially increased presumably by the accompanying rise in gas pressure in the evacuated space. While the relative amounts of the inert material and the water reactive material may be varied within wide limits I may say that I have used successfully an intimate mixture of three parts lampblack and two parts phosphorous pentoxide by weight as the filling material 3.

Other water absorbents may be used in this manner. In particular I may mention finely divided alumina which has been fired in a vacuum to an elevated temperature, say, 1000° C. Finely divided calcium oxide is less suitable but could be used under some conditions. In some cases the finely-divided material in the gas-free space may consist solely of a material which is capable of removing water vapor, as for example, vacuum fired alumina.

What I claim as new and desire to secure by Letters Patent of the United States is:—

1. A heat insulated device comprising a vacuum-walled receptacle, and a finely divided solid material contained in the vacuous space comprising in part at least a substance having a strong affinity for water, for preventing detrimental absorption of water by said material.

2. A device comprising spaced double walls, a finely divided heat insulating material in the space between said walls, and a water absorptive material mixed with said heat insulating material for absorbing water therefrom.

3. A heat insulator comprising an evacuated container and a charge therein comprising a mixture of finely-divided inert solid material and phosphorous pentoxide.

4. A double-walled receptacle having a gas-free space between the walls thereof, a finely divided solid material in said space and a quantity of water absorptive material in said space for absorbing water from said solid material.

5. A double-walled receptacle having the space between said walls evacuated of gases and charged with a mixture of lampblack and phosphorous pentoxide, the latter material being present in a substantial quantity, sufficient to absorb residual water vapor.

6. A heat-insulated device comprising an evacuated receptacle and a charge of finely divided material in said receptacle comprising by weight about three parts lampblack and two parts phosphorous pentoxide.

In witness whereof, I have hereunto set my hand this 28th day of October, 1926.

WILLIAM D. COOLIDGE.